May 6, 1958  K. BOEHM ET AL  2,833,024
ROTARY SAW
Filed April 2, 1956  2 Sheets-Sheet 1
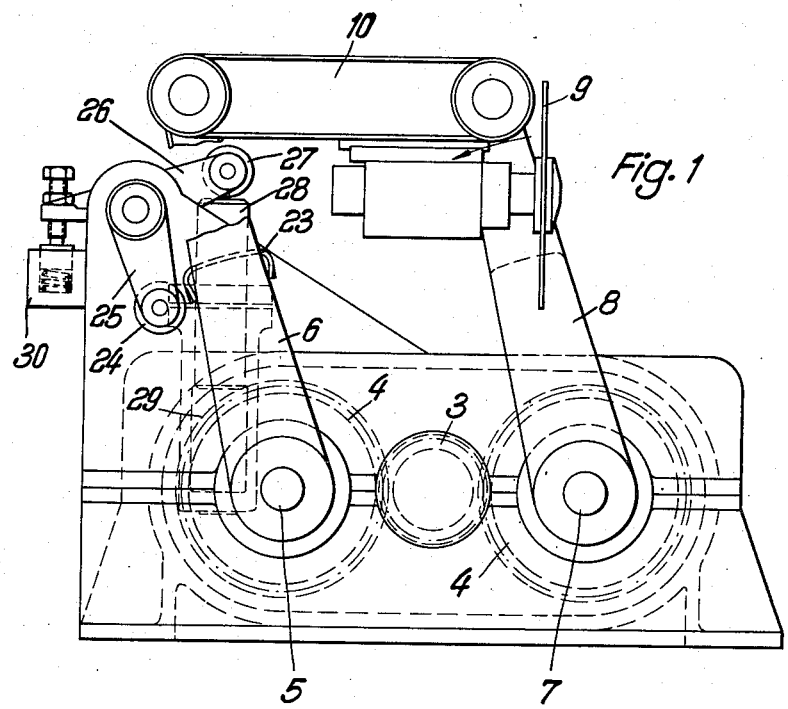
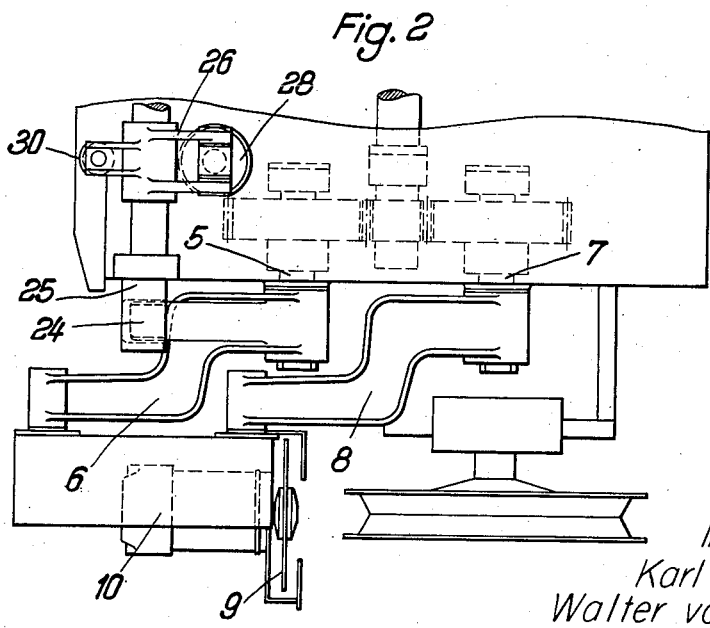
Inventors
Karl Boehm
Walter von Dorp
By their attorneys
Howson and Howson May 6, 1958 K. BOEHM ET AL 2,833,024
ROTARY SAW
Filed April 2, 1956 2 Sheets-Sheet 2

Inventors
Karl Boehm
Walter von Dorp
By their attorneys
Howson and Howson

United States Patent Office 2,833,024
Patented May 6, 1958

2,833,024

ROTARY SAW

Karl Boehm, M. Gladbach, and Walter von Dorp, Rheydt, Germany, assignors to Mannesmann-Meer Aktiengesellschaft, M. Gladbach, Germany, a German company Application April 2, 1956, Serial No. 575,471

Claims priority, application Germany March 31, 1955

1 Claim. (Cl. 29—69)

This invention relates to a rotary saw for cutting rolling mill stock, especially moving pipe, from a rolling mill or welding installation. It is particularly applicable to reducing rolling mills. In such constructions the saw rotates about its own axis continuously at a given speed, and the saw and its drive motor are mounted on a carriage which moves in a circular orbit at right angles to the direction of movement of the moving pipe. The carriage therefore acts as the saw blade transport and returns the saw to the starting point of its orbit for subsequent cycles of operation. The saw is accelerated in its orbit for each cut from a standstill to the speed of travel of the tube and it is decelerated after the cut to a standstill. In machines of the type according to the present invention, the cutting orbit of the saw is initiated by the pipe itself through the use of photoelectric limit switches. It has been found desirable to keep down the weight of the mass which must be accelerated and decelerated in the orbit at right angles to the pipe. According to the present invention, a large reduction in the size of these rotating masses makes it possible to increase the speed of the rolling stock which is to be cut by the saw. It is characteristic of the present invention that the levers carrying the saw blade carriage are offset out of line and when rotating they pass in overlapping relation. The axes of rotation or shafts on which they are mounted therefore are brought closer together. This reduces the size of the rotating mass. Another characteristic of the invention is that within the area of the elbow of one of the levers, a curved sector is provided which serves to fix a definite position of the lever.

In the drawings,

Fig. 1 is a partial view in side elevation of a rotary saw according to my invention having a circular orbit for its axis in order to cut tubular goods emerging from a rolling or welding mill.

Fig. 2 is a plan view on a smaller scale of the rotary saw of Fig. 1, the parts being shown stopped in a slightly different position.

Figure 3:
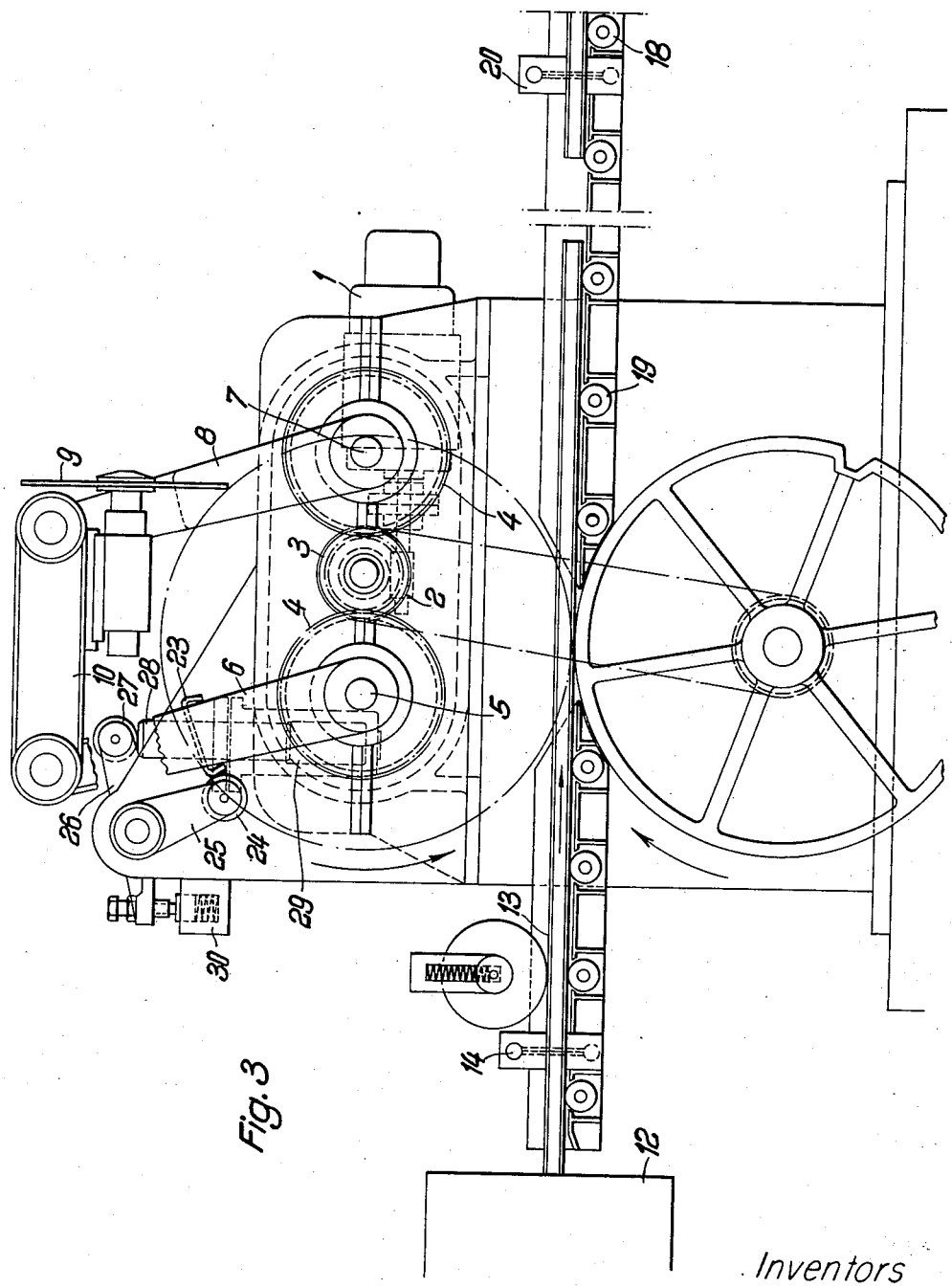
Fig. 3 is a view in side elevation showing the position of the saw relative to the tube emerging from the rolling mill.

Referring to the drawings, power means 1 drive a pinion 2 which rotates gears 3 and 4 in the same direction and the parallel shafts 5 and 7 carrying the gears. On these two shafts 5, 7 are tightly fastened two levers 6 and 8 supporting a saw blade carriage 10. On this carriage is the actual saw blade 9 rotating on its own axis in a plane parallel to the shafts 5, 7.

As shown in Fig. 2, the two levers 6 and 8 are offset out of line at points intermediate their ends and as a result are able to pass out of line in overlapped relation when rotating about their shafts 5 and 7. By placing the shafts 5 and 7 close together and thus taking advantage of the right angle bends or elbows of the levers, the saw blade carriage 10 is correspondingly shortened and the weight of the mass moving through the orbit is reduced. This in turn makes it possible to move the saw more rapidly and therefore increase the speed at which the stock emerges from the rolling mill.

As shown in Fig. 3, the power motor and the saw 9 with its motor are located above the pipe 13 coming from the rolling mill 12. The pipe moves from left to right in Fig. 3 and the lower part of the orbit of the travelling saw is also from left to right. As the pipe emerges from the mill it first meets a waste-end photocell 14 which can initiate the motion of the saw through its orbit by means hereinafter described. The pipe at this point is moved by a first conveyor 19. After each cut the cut piece is carried along by a second conveyor 18 which moves faster than the first conveyor 19. In this way the cut part becomes separated from the uncut pipe. Near the second conveyor 18 is a pipe length photocell 20. When the beam from the photocell 20 is intercepetd by the end of the uncut pipe it gives an impulse which causes a cycle of the saw orbit, as in the case of cell 14. Thus cell 20 can be used to cut desired pipe lengths.

In addition to the continously rotating saws, reciprocating saws are known which must reciprocate longitudinally for each cut and which, between individual cycles, have idle time with a dead center stop at each end of the stroke. The disadvantage of these reciprocating saws is that they have to return alongside the pipe, necessitating a complicated and sensitive control of the saw blade position during reciprocating motion. This necessary control of position of the saw blade in connection with the reciprocating motion has the further disadvantage of making practically impossible any appreciable increase over the maximum obtainable travelling speed of the pipe.

In order that the saw may start travel of its orbit in response to signals originated by the photocells 14 or 20 and at a predetermined point in the orbit or cycle, we provide the following structure.

On the lever 6 is a curved sector 23. This sector is on the lever 6 at or near the offset in the lever. It cooperates with the following stop mechanism controlled from the photocells. There is a roller 24 on the end of a lever 25 which normally bears against the sector 23 holding the lever 6 and the rest of the saw carriage against movement (see Fig. 1). This lever 25 is pivoted on the frame of the machine and in turn rocks a lever 26 on the same axis. This lever 26 has a roller 27 on one end, this roller resting on a vertical plunger 28. The plunger moves in a cylinder 29 filled with compressed air. At the lower end of the cylinder are located a movable electromagnetic valve and a safety valve (not shown). In order that the saw may start by means of a current impulse derived from a photocell as above described, the electromagnetic valve is opened, setting the main drive motor 1 in operation and releasing the compressed air. Because of the lifting of this valve, the cylinder and the lever 25 drop and the bent lever 6 is able to push by the roller 24.

After a definite angle of rotation of the lever 6, for example 90°, the electromagnetic valve is closed by means of a star cam switch (not shown) at the main drive motor whose cam has the same angular speed as the lever 6. At the same time, as a result of the closing of the electromagnetic valve, compressed air is admitted to the cylinder space 29. The compressed air lifts the plunger 28, the latter acts on the roller 27, and through the levers 26 and 25, on the roller 24. The lever 24 and roller 25 now are positioned to hold the lever 6 fast in starting position, as shown in Fig. 1.

Before the lever 6 reaches this position the motor is decelerated so that it moves slightly against the roller 24. A certain elasticity of the holding device is assured by spring means 30 on the lever 26.

If the braking action of the motor fails, the safety valve in the cylinder 29 responds and releases the plunger 28, thereby causing movement of the lever 26.

What is claimed is:

A rotary saw for cutting tubular stock emerging from a rolling mill, particularly a reducing rolling mill, comprising a saw, a table supporting the saw and having a circular orbit of movement of constant radius, and means to actuate the table through its orbit from a standstill to a speed which, while cutting, will approximate the speed of the stock emerging from the mill and then return the table to a standstill; said table actuating means including two offset overlapping levers supporting the table, the axes of said levers being parallel; whereby the size and weight of the moving table are minimized and the speed of the emerging stock can be increased.

References Cited in the file of this patent

UNITED STATES PATENTS

| | | |
|---|---|---|
| 2,332,013 | Rudert et al. | Oct. 19, 1943 |
| 2,693,630 | Rodder | Nov. 9, 1954 |